Patented Apr. 6, 1948

2,439,093

UNITED STATES PATENT OFFICE 2,439,093

THERMOPLASTIC COMPOSITIONS CONTAINING CELLULOSE ACETATE BUTYRATE

Lester W. A. Meyer, Kingsport, Tenn., assignor to Eastman Kodak Company, Rochester, N. Y., a corporation of New Jersey No Drawing. Application January 9, 1946, Serial No. 640,147

10 Claims. (Cl. 106—173)

This invention relates to compositions of cellulose esters having a propionyl or butyryl content of at least 30% and alkyl abietates or hydrogenated alkyl abietates.

The cellulose ester art is continually interested in materials to mix with cellulose esters which are readily available and which serve for various types of cellulose ester compositions. For instance, cellulose esters having a high propionyl or butyryl content are adapted for various purposes, particularly for molding compositions and for hot melt-coating compositions. Also, compositions of esters of this type may be useful for extrusion processes or for the preparation of sheeting of good qualities. Ordinarily, for these various purposes plasticizer is mixed with the cellulose ester. However, many of the plasticizers which are found to be useful for one purpose for which high propionyl or butyryl esters are adapted are either unsuitable or less desirable for other purposes than some other types of plasticizer.

One of the objects of this invention is to provide plasticizers for cellulose esters having high propionyl or high butyryl contents which are useful generally for the purposes to which those esters are put. Another object of this invention is to provide thermoplastic compositions which are readily adapted to use in melt-coating processes. Still another object of this invention is to provide a plasticizer for high propionyl or high butyryl cellulose esters which is readily available. Another object of this invention is to provide compositions which are useful for molding purposes. Other objects of this invention will appear herein.

I have found that cellulose esters having a high content of saturated fatty acid groups of 3-4 carbon atoms are readily compatible with alkyl abietates and with hydrogenated alkyl abietates and that the compositions which may be prepared thereby are useful for molding purposes or for melt-coating processes. Also, these compositions may be employed in other ways, such as in extrusion operations or in the preparation of sheeting.

For molding purposes high propionyl or high butyryl cellulose esters having a propionyl or butyryl content of from 30 to 55% have been recognized as being particularly suitable for that purpose. The class of esters having a viscosity of 5–75 seconds and 1–2 free hydroxyls per 24 carbon atoms in the cellulose unit has been recognized as being useful for thermoplastic compositions. For hot melt-coating operations it has been recognized that the cellulose esters having a propionyl or butyryl content of at least 42% are especially useful in this connection. The preferred esters for this purpose have a melting point of less than 200°, a char point of at least 260° C., and a fundamental cuprammonium viscosity of not more than 10 centipoises. For the preparation of sheeting the esters having higher viscosities are useful. All of these various types of esters having a propionyl or butyryl content of at least 30% are improved or plasticized by mixing therewith a compatible alkyl abietate or hydrogenated alkyl abietate in accordance with my invention.

The plasticizers suitable for use in accordance with my invention are either alkyd abietates, such as methyl, ethyl, isopropyl, butyl, or amyl abietate, or the hydrogenated alkyl abietates. The most readily available alkyl abietate is methyl abietate, preparations of this ester being described in U. S. Patent No. 1,944,241 of Humphrey. Hydrogenated methyl abietate is the most common of the hydrogenated abietates at the present time, and is also described in U. S. Patent No. 1,944,241. In compositions in accordance with my invention it is desirable that the abietate constitute at least 20% of the plasticizer used. The plasticizer may be a single abietate, a mixture of abietates, or a mixture of one or more abietates with some other plasticizing material. In compositions in accordance with my invention the plasticizer containing at least 20% of an abietate should be employed in amounts 5–200% of the cellulose ester. In the preparation of molded products or products where any exudation of plasticizer is objectionable, it is desirable to use only 5–50% of plasticizer. However, in cases where the plastic is to be in contact with some fibrous material, such as paper, so that any exuded plasticizer is readily taken up, amounts of plasticizer up to as much as 200% may be employed, the amount of plasticizer to be used depending upon the circumstances of operation.

The plasticizer to be incorporated with the cellulose ester may be added in any manner in which plasticizers are added to cellulose esters. For instance, the cellulose ester may be comminuted or powdered and the plasticizer added thereto in a mixing operation. If desired, the cellulose ester may be worked up on hot rolls with the plasticizer mixed therewith, in this way obtaining a uniform mixing of the plasticizer and cellulose ester. Any of the methods in which uniform distribution of the plasticizer in the cellulose ester is accomplished may be employed in preparing compositions in accordance with my invention.

The cellulose ester employed as the ester constituent of our composition may be a cellulose butyrate, a cellulose acetate butyrate, a cellulose propionate, a cellulose acetate propionate, a cellulose propionate butyrate, or in fact, any cellulose ester in which the content of fatty acid groups of 3-4 carbon atoms constitutes at least 30% of the ester. These esters may be prepared as described in Gardner Patent No. 2,113,301, or in Malm and Kirton Patent No. 2,250,201, or by any other method in which cellulose esters of the type specified are prepared, particularly if degradation is kept to a minimum. It is also desirable that the cellulose esters employed, particularly if the compositions are to be used for molding purposes or for hot melt-coating compositions, have good stability as evidenced by a char point of at least 260° C., and preferably 300° C. or more. The esters may be stabilized as described in Malm and Kirton Patent No. 2,250,201, or by the method described in Malm and Crane Patent No. 2,346,498, or by any stabilization method in which a cellulose ester of good stability is obtained. For some purposes, such as where the ester products are formed without the use of melting temperatures, stabilizing treatment may be unnecessary.

The more useful cellulose esters having the range of propionyl or butyryl content described herein are those which have been hydrolyzed to some extent, such as those which have 1-2 free hydroxyls per 24 carbon atoms in the cellulose unit. It is to be understood, however, that my invention is not limited to the degree of hydrolysis of the cellulose esters as the abietates also exhibit plasticizing properties when used with the less hydrolyzed cellulose esters. Also, in the case of esters hydrolyzed beyond two hydroxyl groups, the abietates have been found to improve the characteristics of the material for various purposes.

For most purposes the abietates of technical grade may be employed. However, in cases where the characteristics of the impurities in the technical grade material are objectionable, it is desirable to use abietate which have been purified to a higher degree than is met with in the ordinary commercial product. For instance, in the making of colorless materials the purer grades of abietates have been found to retain their desirable characteristics for a longer time than some of the technical grades of abietates in which impurities are present.

My invention includes both those compositions in which the only plasticizers employed are abietates and also those compositions in which the abietates are employed in added mixture with other suitable plasticizers. For instance, in melt-coating operations butyl stearate alone is not suitable for use as a plasticizer, whereas mixed with alkyl abietates in various proportions, good melt-coating compositions are obtained. Also, if desired, alkyl abietates may be mixed in an amount at least 20% of the total plasticizer with the compositions described in U. S. Patents Nos. 2,387,773 and 2,387,774 of Salo and Vivian.

My invention includes molding compositions as specified herein, melt-coating compositions as described, and also fibrous materials or web, such as paper or cloth which has been coated with these compositions.

The proportion of plasticizer to incorporate with the cellulose ester is governed by the flow temperature which is desired in the resulting composition. For instance, in the case of molding compositions, increase of the proportion of plasticizer therein will reduce the flow temperature and thus result in a softer article than is obtained with a reduced proportion of plasticizer. Also, in melt-coating compositions the amount of plasticizer incorporated should be such that a composition is obtained having a fluidity for coating at a reasonable temperature, such as at about 170° C. or below. The amount of plasticizer necessary is best determined by the acetone viscosity of the cellulose ester being used; the higher viscosity esters needing more plasticizer or in lieu thereof a higher temperature for the coating operation. For the coating of paper it is especially desirable that sufficient plasticizer be incorporated in the cellulose ester that a fluid temperature of not more than 170° C. is obtained as a temperature of 170° C. is the maximum which can be used without detrimentally affecting the paper sheet. For the guidance of anyone who desires to prepare a melt-coating composition, it may be stated that using an ester having a 200 centipoises acetone viscosity, the ratio of ester to plasticizer should be not more than approximately 2 to 1 to obtain a fluidity not greater than 170° C. Otherwise a higher coating temperature, such as 200-210° C. is necessary. Such a higher temperature can, of course, be used for coating materials, such as metal or cloth which will not be deteriorated by those temperatures. If a 100 centipoise acetone viscosity cellulose ester is employed, the ratio of ester to plasticizer may be up to 4 to 1 with fluidity resulting at a temperature of not more than 170° C.

The melt-coating compositions in accordance with our invention may be employed to prepare coatings which are free of tackiness or, in other words, may be characterized as non-blocking. The molding compositions in accordance with my invention are characterized by good resistance to moisture and good tensile and flexural strengths. The following examples illustrate my invention:

*Example 1.*—A melt was prepared by heating 35 parts of hydrogenated methyl abietate to a temperature of 160-180° C. and stirring therein one part of paraffin and 65 parts of a cellulose acetate butyrate having a butyryl content of approximately 47% and an acetyl content of approximately 6% and a viscosity of 76 centipoises at 25° C. in a 10% solution in acetone. This melt was coated out by means of a melt-coating machine on both sides of glassine paper, the machine being a Waldron type melt-coating machine. The product obtained was a flexible, water-repellent, and non-tacky coated paper.

*Example 2.*—A melt was prepared in a similar fashion as in the preceding example, the composition consisting of 35 parts of hydrogenated methyl abietate and 35 parts of cellulose acetate butyrate having a butyryl content of approximately 47%, an acetyl content of approximately 6%, and a viscosity of 3 centipoises at 25° C. in a 10% solution in acetone. The melt was coated out onto 12-pound unsized stock high alpha cellulose paper. A water-resistant sheet having greatly improved translucency was obtained. Due to the unsized nature of the paper, impregnation as well as coating of the paper occurred.

*Example 3.*—The conditions were the same as in the preceding example except that 45 parts of hydrogenated methyl abietate and 35 parts of cellulose acetate butyrate were employed.

*Example 4.*—Example 2 was duplicated except that 55 parts instead of 35 parts of hydrogenated methyl abietate were employed.

*Example 5.*—Photographic paper was coated with melts having the compositions specified below. These melts were prepared and coated out as described in the preceding examples, the cellulose acetate butyrate employed having a butyryl content of approximately 47%, an acetyl content of approximately 6%, and a viscosity of 26 centipoises.

| Cellulose Acetate Butyrate | Butyl Stearate | Hydrogenated Methyl Abietate |
|---|---|---|
| 70 | 24 | 6 |
| 70 | 20 | 10 |
| 70 | 15 | 15 |
| 70 | 10 | 20 |
| 70 | 6 | 24 |

*Example 6.*—The procedure of Example 5 was repeated except that methyl abietate was employed instead of hydrogenated methyl abietate in the proportions given. The products in Examples 5 and 6 were found to be even slightly better as regards blocking characteristics than were the products in which butyl stearate was not employed. With the papers in which a quite large proportion of butyl stearate was employed it was found that the paper would not even block at a temperature of 200° F. when heating for sixteen hours using a pressure of 5 pounds per square inch.

*Example 7.*—100 parts of a cellulose acetate butyrate having a butyryl content of approximately 48% were mixed with 12½ parts of dibutyl sebacate, 12½ parts of butyl stearate, and 25 parts of hydrogenated methyl abietate. A composition was obtained having a low viscosity upon melting which formed melt-coatings having good clarity.

*Example 8.*—In the preceding example methyl abietate was substituted for hydrogenated methyl abietate. A composition was obtained which was found to be useful for melt-coating purposes, the coating obtained even being tougher than that resulting from the use of hydrogenated methyl abietate.

The only limitation as to upper limit beyond the proportion of plasticizer used to cellulose acetate butyrate is whether or not exudation will occur. Examples 2, 3, and 4 illustrate instances where exudation is not a factor, because of the paper's being of a type which absorbs any plasticizer which might be exuded by the coating. Therefore, for coating unsized paper or some types of fabric which have absorbent properties proportions of plasticizer up to 200%, based on the cellulose ester, may be employed. These compositions because of the high plasticizer content melt very readily, but, because of the absorption of plasticizer, the tackiness is not as great as would be expected. Using such compositions some of the plasticizer would be volatilized depending upon the melt temperature which is employed. Other methods might be employed for removing plasticizer from the coating to improve the properties of tackiness and avoid exudation, if the absorbency of the material coated cannot be depended upon to remove the excessive amount of plasticizer which may be present in compositions using such large proportions of plasticizer to a cellulose acetate butyrate.

Molding compositions were prepared in accordance with my invention as follows and were given the customary test for molding compositions. The cellulose ester used was a stable, slightly hydrolyzed cellulose acetate butyrate having a butyryl content of 37.5%, an acetyl content of 13%, and a char point of 295° C. The ester was mixed with methyl abietate or hydrogenated methyl abietate, and the results of the testing of those compositions are as follows:

| Plasticizer per 100 Parts of Cellulose Ester | Hardness | | Elongation | | Tensile Strength | | Flexural Strength | | Per cent Gain on Immersion | Per cent Gain in 80% Relative Humidity | Loss on Heat |
|---|---|---|---|---|---|---|---|---|---|---|---|
| | Shore | Rockwell | Dry | Wet | Dry | Wet | Dry | Wet | | | |
| 30 Methyl Abietate | 63.1 | 81.2 | 30.4 | 48.7 | 4,586 | 4,098 | 7,366 | 6,036 | 0.84 | 0.46 | .05 |
| 10 Methyl Abietate | 74.9 | 94.6 | 13.4 | 18.1 | 6,988 | 5,932 | 12,178 | 9,838 | 1.30 | 0.70 | .06 |
| 10 Hydrogenated Methyl Abietate } 5 Diamyl Phthalate | 64.0 | 89.2 | 31.2 | 33.75 | 6,034 | 4,761 | 10,054 | 7,622 | 0.99 | 0.60 | .05 |
| 30 Hydrogenated Methyl Abietate } 5 Diamyl Phthalate | 54.7 | 72.0 | 54.68 | 95.5 | 4,500 | 3,775 | 5,634 | 4,260 | 0.77 | 0.41 | .07 |
| 40 Hydrogenated Methyl Abietate | 49.4 | 60.0 | 63.26 | 122.72 | 3,548 | 3,608 | 4,250 | 3,458 | 0.71 | 0.39 | .11 |
| 10 Hydrogenated Methyl Abietate } 5 Diethyl Phthalate | 53.0 | 60.6 | 25.2 | 40.7 | 5,854 | 4,718 | 9,782 | 7,198 | 0.98 | 0.63 | .12 |
| 20 Hydrogenated Methyl Abietate } 5 Diethyl Phthalate | 63.8 | 84.6 | 31.4 | 92.1 | 4,663 | 4,724 | 7,584 | 5,680 | 0.78 | 0.48 | .19 |
| 40 Hydrogenated Methyl Abietate } 5 Diethyl Phthalate | 54.0 | 62.4 | 101.2 | 138.7 | 4,087 | 3,560 | 4,075 | 3,482 | 0.61 | 0.37 | .28 |
| 60 Hydrogenated Methyl Abietate } 20 Diethyl Phthalate | 31.9 | −5.4 | 212.0 | 195.25 | 2,133 | 1,382 | 903 | 657 | 0.40 | 0.37 | 1.48 |
| 50 Hydrogenated Methyl Abietate } 30 Diethyl Phthalate | 33.2 | | 328.7 | 347.5 | 1,856 | 1,596 | 1,011 | 1,133 | 0.63 | 0.51 | .30 |
| 30 Hydrogenated Methyl Abietate } 5 Diethyl Phthalate | 57.9 | 68.6 | 94.33 | 119.8 | 4,834 | 4,314 | 5,479 | 4,166 | 0.61 | 0.48 | .14 |
| 50 Hydrogenated Methyl Abietate } 5 Diamyl Phthalate | 25.4 | −90.8 | 610.0 | 386.0 | 1,225 | 1,037 | 344 | 590 | 0.63 | 0.47 | .21 |
| 20 Hydrogenated Methyl Abietate } 5 Diamyl Phthalate | 60.1 | 91.6 | 42.13 | 46.13 | 5,134 | 4,306 | 7,898 | 5,860 | 0.96 | 0.47 | .06 |
| 30 Hydrogenated Methyl Abietate } 30 Santolite MHP | 71.3 | 80.4 | 26.00 | 37.39 | 4,570 | 3,735 | 8,126 | 5,350 | .57 | .38 | .14 |
| 10 Methyl Abietate } 5 Diamyl Phthalate | 69.7 | 92.2 | 38.0 | 32.0 | 6,492 | 4,770 | 10,280 | 7,584 | 1.07 | .63 | .01 |
| 20 Methyl Abietate } 5 Diamyl Phthalate | 63.4 | 87.8 | 39.8 | 47.9 | 5,168 | 4,394 | 7,480 | 5,736 | .86 | .46 | .01 |
| 30 Methyl Abietate } 5 Diamyl Phthalate | 55.5 | 72.8 | 59.3 | 91.4 | 4,349 | 3,658 | 5,502 | 3,806 | .69 | .41 | .03 |
| 40 Methyl Abietate } 5 Diamyl Phthalate | 50.5 | 58.8 | 92.1 | 116.1 | 3,809 | 3,709 | 3,842 | 3,058 | .66 | .37 | .01 |
| 10 Hydrogenated Methyl Abietate } 5 Dibutyl Phthalate | 68.5 | 93.6 | 29.11 | 26.00 | 5,778 | 4,341 | 10,684 | 8,658 | 1.02 | .55 | .07 |

Santolite MHP is an aryl sulfonamide-formaldehyde resin, the aryl groups of which are a mixture of phenyl and tolyl groups.

I claim:

1. A hot melt-coating composition essentially consisting of cellulose acetate butyrate having a butyryl content of approximately 47-50% and 5-50% of a plasticizer essentially consisting of butyl stearate and methyl abietate.

2. A composition of matter essentially consisting of 100 parts of a lower fatty acid ester of cellulose having a content of saturated fatty acid groups of 3-4 carbon atoms of at least 30% and 5-200 parts of a plasticizer at least 40% of which is from the group consisting of the alkyl abietates and the hydrogenated alkyl abietates.

3. A composition of matter essentially consisting of 100 parts of a lower fatty acid ester of cellulose having a content of saturated fatty acid groups of 3-4 carbon atoms of at least 30% and 5-50 parts of a plasticizer at least 40% of which is from the group consisting of the alkyl abietates and the hydrogenated alkyl abietates.

4. A hot melt-coating composition essentially consisting of 100 parts of a heat stable butyric acid ester of cellulose having a butyryl content of at least 42% and 5-200 parts of a plasticizer therefor at least 40% of which is from the group consisting of the alkyl abietates and the hydrogenated alkyl abietates.

5. A hot melt-coating composition essentially consisting of 100 parts of a heat stable butyric acid ester of cellulose having a butyryl content of at least 42% and 5-50 parts of a plasticizer therefor at least 40% of which is from the group consisting of the alkyl abietates and the hydrogenated alkyl abietates.

6. A hot melt-coating composition essentially consisting of 100 parts of cellulose acetate butyrate having a butyryl content of 47-50% and 5-50 parts of a plasticizer consisting of butyl stearate and methyl abietate.

7. A hot melt-coating composition essentially consisting of 100 parts of cellulose acetate butyrate having a butyryl content of 47-50% and 5-50 parts of a plasticizer consisting of butyl stearate and hydrogenated methyl abietate.

8. A cellulose web having on at least one of its surfaces a melt coating essentially consisting of 100 parts of a lower fatty acid ester of cellulose having a content of saturated fatty acid groups of 3-4 carbon atoms of at least 30% and 5-200 parts of a plasticizer at least 40% of which is from the group consisting of the alkyl abietates and the hydrogenated alkyl abietates.

9. Paper having on at least one of its surfaces a melt coating essentially consisting of 100 parts of a lower fatty acid ester of cellulose having a butyryl content of at least 42% and 5-200 parts of a plasticizer at least 40% of which is methyl abietate.

10. Paper having on at least one of its surfaces a melt coating essentially consisting of 100 parts of a lower fatty acid ester of cellulose having a butyryl content of at least 42% and 5-200 parts of a plasticizer at least 40% of which is hydrogenated methyl abietate.

LESTER W. A. MEYER.

REFERENCES CITED

The following references are of record in the file of this patent:

UNITED STATES PATENTS

| Number | Name | Date |
| --- | --- | --- |
| 2,094,771 | Charch et al. | Oct. 5, 1937 |
| 2,179,339 | Little | Nov. 7, 1939 |
| 2,216,827 | Mitchell | Oct. 8, 1940 |
| 2,289,229 | Wiggam | July 7, 1942 |
| 2,326,812 | Wiggam | Aug. 17, 1942 |
| 2,387,773 | Salo et al. | Oct. 30, 1945 |

OTHER REFERENCES

Ellis, "Chemistry of Synthetic Resins" (1935), vol. 1, pages 824 and 829.